United States Patent [19]

Tung

[11] 4,390,687
[45] * Jun. 28, 1983

[54] HIGH MELT STRENGTH ELASTOMETRIC COPOLYESTERS

[75] Inventor: William C. T. Tung, Tallmadge, Ohio

[73] Assignee: The Goodyear Tire & Rubber Company, Akron, Ohio

[ * ] Notice: The portion of the term of this patent subsequent to Mar. 3, 1998, has been disclaimed.

[21] Appl. No.: 304,275

[22] Filed: Sep. 21, 1981

[51] Int. Cl.$^3$ ...................... C08G 63/66; C08G 63/18
[52] U.S. Cl. .................................. 528/295; 528/295.3
[58] Field of Search ...................... 528/295.3, 293, 295

[56] References Cited

U.S. PATENT DOCUMENTS

| | | | |
|---|---|---|---|
| 3,033,824 | 5/1962 | Huffman | 528/295 |
| 3,725,348 | 4/1973 | Harrison et al. | 528/295 |
| 3,725,351 | 4/1973 | Harrison et al. | 528/295 |
| 4,233,196 | 11/1980 | Sublett | 528/295 |
| 4,254,001 | 3/1981 | Tung | 528/295.3 |

Primary Examiner—Ronald W. Griffin
Attorney, Agent, or Firm—Daniel J. Hudak; Bruce Hendricks

[57] ABSTRACT

An elastomeric copolyester resin having high melt strength and capable of being blow-molded. The copolyester resin is made by adding to the polymerizing or initial mixture small amounts of an alkali salt of a dialkyl sulfoisophthalate. The copolyester resin contains units of terephthalic acid, butane diol, polytetramethylene glycol, and dimer acid.

11 Claims, No Drawings

HIGH MELT STRENGTH ELASTOMETRIC COPOLYESTERS

TECHNICAL FIELD

The present invention relates to high melt strength copolyester resins having elastomeric properties and to articles prepared therefrom such as blowmolded bellows, boots, bottles containers, and the like.

BACKGROUND ART

Elastic polyester resins made of certain ordered block copolymers are disclosed in U.S. Pat. Nos. 3,023,192 and 3,954,689.

U.S. Pat. No. 4,013,624 discloses elastomeric properties obtained in polyesters having branched chain compounds in their structure.

U.S. Pat. No. 3,890,279 relates to polyesters having side chains therein.

U.S. Pat. No. 4,254,001 relates to elastomeric copolyester resins which can be made into films, fibers, and molded products.

U.S. Pat. Nos. 3,763,109 and 3,766,146 relate to copolyesters having long chain ester units and short chain ester units therein.

U.S. Pat. No. 3,018,272 relates to a condensation polyester having an affinity for basic type dyes wherein the polyester contains a sulfonate group in the form of a metallic salt, said sulfonate group being a substituent of a repeating radical.

None of the above prior art patents disclose elastomeric copolyester resins which have high melt strength and which are capable of being blow-molded. Moreover, they lack any suggestion of a polyester containing an ionic component made from the specific compounds set forth herein.

DISCLOSURE OF INVENTION

It is therefore an object of the present invention to produce an elastomeric copolyester resin having high melt strength.

It is yet another object of the present invention to produce high melt strength elastomeric copolyester resins, as above, utilizing dialkyl esters.

It is yet another object of the present invention to produce high melt strength elastomeric copolyester resins, as above, containing ionic components.

It is yet another object of the present invention to produce high melt strength elastomeric copolyester resins, as above, wherein said ionic component is an alkali salt of dialkylsulfoisophthalate.

It is yet another object of the present invention to produce high melt strength elastomeric copolyester resins, as above, wherein said copolyester is made from dimer acid.

It is yet another object of the present invention to produce high melt strength elastomeric copolyester resins, as above, wherein said copolyester is made from poly(tetramethylene oxide)glycol.

It is yet another object of the present invention to produce high melt strength elastomeric copolyester resins, as above, which can be readily blow-molded and made into articles.

It is yet another object of the present invention to produce high melt strength elastomeric copolyester resins, as above, which resins have a very good melt strength.

In general, a high melt strength, elastomeric copolyester, comprises:

the polymeric reaction product of a mixture of reactants of (a) terephthalic acid or a 1 to 4 carbon atom dialkyl ester thereof;

(b) a dimer acid;

(c) a poly(tetramethylene oxide)glycol having a molecular weight of from about 600 to about 2,000;

(d) 1,4-butane diol; and (e) an ionic compound having the formula

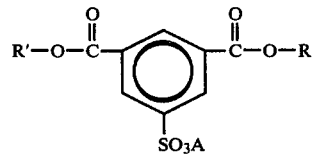

where A is an alkali radical and where R and R' are alkyls having from 1 to 4 carbon atoms, the amount of said terephthalic acid or said dialkyl ester thereof ranging from about 80.0 mole percent to about 99.9 mole percent, and the amount of said dimer acid ranging from about 0.1 mole percent to about 15.0 mole percent, said percentages being based upon the total number of moles of said acid constituents or reactive equivalents thereof in said mixture, the amount of said poly(tetramethylene oxide) glycol in said mixture ranging from about 2.0 to about 12.0 mole percent and the amount of said 1,4-butane diol ranging from about 88.0 mole percent to about 98.0 mole percent, and from about 0.1 to about 5.0 mole percent of said ionic compound, the total mole percent of said acid, said dimer acid, and said ionic compound being about 100 mole percent.

additionally including a molar excess of said 1,4-butane diol ranging from about 5.0 to about 120 percent, said mole percentages of said excess 1,4-butane diol being based upon the total number of moles of said glycol and said 88.0 to said 98.0 mole percent of said 1,4-butane diol so that the molar ratio of all of said glycol constituents to all of said acid constituents or their reactive equivalents and said ionic compound ranges from about 1.05 to about 2.1.

BEST MODE FOR CARRYING OUT THE INVENTION

The high melt strength copolyesters of the present invention can be made by utilizing typical or conventional procedures for making high molecular weight polyesters, including ester interchange, esterification, and polycondensation or a combination of these processes. They are essentially random polymers and are copolyesters in that they contain units of different polyester-forming materials within the polymer chain.

The amount of terephthalic acid or lower $C_1$ to $C_4$ dialkyl esters thereof ranges from about 99.9 to about 85.0 mole percent, with the amount of dimer acid ranging from about 0.1 to about 15 mole percent, said percentages being based on the total number of moles of said acid constituents or reactive equivalents thereof in said mixture. Preferably, the amount of terephthalic acid or the $C_1$ to $C_4$ dialkyl ester thereof ranges from about 86.8 to about 99.5 mole percent, and from about 0.5 to about 13.2 mole percent of the dimer acid. The dialkyl esters are preferred in the present invention with dimethyl terephthalate being especially preferred. The amount of poly(tetramethylene oxide)glycol in the mixture, having a molecular weight average of from about 600 to about 2,000, ranges from about 2.0 to about 12.0 mole percent and the amount of 1,4-butane diol ranges from about 98.0 to about 88.0 mole percent. A molar excess of said 1,4-butane diol; that is, an amount in addition to the above-noted 88.0 to 98.0 mole percent of said 1,4-butane diol and said 2.0 to 12.0 mole percent of said poly(tetramethylene oxide)glycol, is utilized in an amount of from about 5.0 to about 120.0 percent. In other words, although a mole amount of glycol and diol is used approximately equal to the mole amount of the acids, a further amount of 1,4-butane diol (5 to 120 mole percent) is also used to ensure complete reaction of the acids. Thus, the total molar amount of polyhydric alcohols is 1.05 to 2.2 as great as the total molar amount of the acids. This excess is employed in order to ensure reasonable rates of reaction between the glycol constituents and the acid constituents or the reactive equivalents thereof. As a result of the use of this excess of the 1,4-butane diol, the molar ratio of all the glycol constituents to all of the acid constituents or their reactive equivalents in the mixture will range from about 1.05:1.0 to about 2.20:1.0.

The dimer acid containing a total of 36 carbon atoms useful in preparing the high melt strength copolyesters constituting the present invention is itself prepared from an unsaturated fatty acid containing 18 carbon atoms such as linoleic and linolenic acid or the monohydric alcohol esters thereof. The actual preparation and structure of dimerized $C_{18}$ fatty acids are described in J.A.C.S. 66,84 (1944) and U.S. Pat. No. 2,347,562, both of which are fully incorporated herein by reference. Several different grades of dimer acid are available from commercial sources and these differ from each other primarily in the amount of the monobasic and trimer acids fractions and the degree of unsaturation. It is preferred, for purposes of this invention, that the dimer acid be substantially free of the monobasic and trimer acids fractions and essentially completely saturated, and be added after the transesterification reaction; that is, at the condensation stage. Two different grades of dimer acid, which are useful in preparing the copolyesters herein described and meet the above requirements are available from Emery Industries, Inc. under the trade name Empol 1010 dimer acid, typically containing 97 percent dimer acid, 3 percent trimer acid, and essentially no monobasic acids and extremely low unsaturation, and Empol 1014 typically containing 95 percent, 4 percent, and 1 percent of dimer, trimer, and monobasic acids, repectively.

It has been unexpectedly found that the addition of small amounts of various ionic compounds to the initial mixture; that is, the esterification or the transesterification mixture, result in a copolyester resin which has good high melt strength properties and can be readily utilized for making blow-molded articles therefrom. The ionic compound generally contains an $SO_3$ radical attached to the benzene ring of an aromatic diacid. The ionic compound can be represented by the general formula:

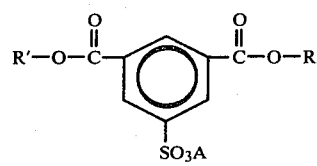

where A is an alkalin radical such as lithium, sodium, potassium, rubidium, or cesium, with lithium, sodium, and potassium being desirable and sodium being prepreferred, and R and R' are alkyls having from 1 to 4 carbon atoms, preferably 1, i.e., methyl, and can be the same or different. Accordingly, dimethylsulfoisophthalate is preferred. The amount of the alkali dialkylsulfoisophthalate compound ranges from about 0.1 to about 5.0 mole percent and preferably from about 0.1 to about 3.0 mole percent. The ionic compound is substituted for either the acid or dimer acid, or both. Accordingly, the total mole percent of the acid and/or dimer acid will be less than 100 percent and will range from about 95 mole percent to about 99.9 mole percent, with the remaining 0.1 to 5.0 mole percent being the ionic compound. Hence, the amount of acid (terephthalic acid, etc.) will range from about 80 to 99.9 mole percent with a preferred range of from about 81.8 to about 99.5 mole percent. The total amount of the acid, the dimer acid and the ionic compound will be approximately 100 mole percent. Although a small portion of the acids are replaced by the ionic compound, the molar amounts as well as total molar amounts of the polyhydric alcohols remains the same as set forth above. In other words, the total molar amount of the polyhydric alcohols will range from about 1.05 to about 2.2 the amount of the acids and the ionic compound. That is, the ionic compound is considered as an acid. Although the ionic compound can be added at any stage of the polymerization, preferably it is added at the beginning stage; that is, to the esterification or the transesterification mixture.

The elastomeric, random copolyesters of the present invention and derived from the reaction mixtures defined hereinabove including the ionic compound, are prepared by conventional and well known techniques used in preparing high molecular weight polyesters. In general, the copolyesters are prepared by first subjecting the mixture of reactants to elevated temperatures under an inert gas atmosphere at atmospheric or superatmospheric pressures in the presence of a catalyst to promote the esterification or combined transesterification/esterification reactions, depending on the nature of the starting materials, between the glycol constituents and the acid constituents or reactive equivalents thereof comprising said mixtures. Known catalysts useful in promoting these reactions include the zinc, magnesium, calcium, manganese, lead and titanium containing compounds. The amount of catalyst used can be varied over a wide range. Generally, the amount used will be in the range of from about 0.005 to about 0.03 percent by weight based on the amount of reactants used. The temperature normally employed to affect the esterification or combined transesterification/esterification reactions will generally range from about 150° C. to about 240° C. and preferably from about 190° C. to about 230° C.

Following completion of the esterification or combined transesterification/esterification reaction, the low molecular weight oligomer product produced thereby is subjected to polycondensation. The polycondensation reaction will be carried out at temperatures ranging from about 220° C. to about 280° C. and preferably from about 240° C. to about 270° C. at pressures below 15 and preferably below 1 millimeter of mercury (mmHg) pressure in the presence of a polycondensation catalyst such as the known antimony, titanium, iron, zinc, cobalt, lead, manganese, niobium or germanium catalysts.

The intrinsic viscosities of the polyesters of the present invention, as determined in a 60/40 by volume mixed solvent system of phenol and tetrachloroethane at 30° C., range from about 0.90 to about 1.5 and preferably from about 0.9 to about 1.3.

The invention will be better understood by the following examples which illustrate the preparation of the copolymers and the effect of the ionic compound upon the melt strength.

EXAMPLE I 8.69 pounds of dimethylterephthalate (DMT), 8.1 pound of butane diol (B.D.), 6.0 pound of poly(tetramethylene oxide) glycol (Polymeg 1000, manufactured by the Quaker Oats Company and having a molecular weight of about 1,000), and 142.2 grams of dimethyl sodium sulfoisophthalate (DMSIPA) were charged to a reaction with 54 grams of titanium catalyst (tetrabutyltitanate glycolate in ethylene glycol) to give a 60 ppm of titanium. The transesterification reaction was carried out at 180°-200° C. under $N_2$ atmosphere. When the transesterification reaction was completed, no more by-product (methanol) was distilled over. 4.0 pounds of dimer acid was added to the reaction for esterification reaction which was carried out at 200°-230° C. for about 40 minutes. When the by-product, water, stopped to distill over, the reaction mixture was transferred to the polymerization reactor. The polymerization was carried out under high vacuum and high temperature (250°-260° C.), and all the excess glycol was removed in this step. The polymer was discharged after about 65 minutes.

EXAMPLE II

The melt strength of the polymer was measured by the time required for extrudate to travel the first four inches from a tube die. The longer the time of traveling, the higher the melt strength.

Several high melt strength copolyester elastomers have been produced with similar procedures as those described in Example I. Their composition and traveling times are listed below. All examples containing ionic dimethyl sodium sulfoisophthalate have higher melt strength (longer traveling time) than those of controls containing no dimethyl sodium sulfoisophthalate.

| COMPOUND | Composition (Molar Percent) EXAMPLE | | | | | | | |
|---|---|---|---|---|---|---|---|---|
| | 1 | 2 | 3 | 4 | 5 | 6 | 7 | 8 |
| Dimethylterephthalate | 84.8 | 85.8 | 86.8 | 95.4 | 94.4 | 93.4 | 99.5 | 98.5 |
| Dimer | 13.2 | 13.2 | 13.2 | 4.6 | 4.6 | 4.6 | 0.5 | 0.5 |
| Dimethyl-sodium-sulfoisophthalate | 2 | 1 | 0 | 0 | 1 | 2 | 0 | 1 |
| Butane diol | 88.7 | 88.7 | 88.7 | 90.1 | 90.1 | 90.1 | 98 | 98 |
| Poly(tetramethylene oxide) | 11.3 | 11.3 | 11.3 | 9.9 | 9.9 | 9.9 | 2 | 2 |

| COMPOUND | Composition (Molar Percent) EXAMPLE | | | | | | | |
|---|---|---|---|---|---|---|---|---|
| | 1 | 2 | 3 | 4 | 5 | 6 | 7 | 8 |
| | TRAVELING TIME (SECONDS) | | | | | | | |
| | 24 | 19 | 12.5 | 9.5 | 13.5 | 13 | 12.5 | 29 |

The high melt strength copolyester resins of the present invention can be modified somewhat by the incorporation of conventional compounds such as plasticizers, lubricants, fillers, pigmenting agents, and stabilizers. The stabilizers added provide additional stability against the deteriorating effects of heat or light. Phenols, amines, oximes, and salts of metals are suitable stabilizers.

The copolyesters of the present invention generally have a melting point in the range of from about 180° C. to about 220° C. The melting point of the copolyester as utilized in the specfication is the minimum temperature at which a sample of polymer leaves a wet molten trail as it is drawn across the surface of a heated block of aluminum. Sometimes this temperature is called a polymer stick temperature.

In addition to being utilized for making bellows, boots, as for use in various automotive compenents, bottles or containers via blow-molding, the copolymers of the present invention can also be utilized as yarn, low denier filaments, and thus can be utilized in two-way stretch, woven, or knitted articles. It can also be utilized in non-woven fabrics as bonding materials and paper and in the non-woven fabrics.

While the accordance with the patent statutes, the best mode and preferred embodiments have been set forth, it will be apparent to those skilled in the art that various changes and modifications can be made without departing from the spirit or scope of the invention. Accordingly, the invention is measured by the scope of the attached claims.

What is claimed is:

1. A high melt strength, elastomeric, copolyester, comprising:
   the polymeric reaction product of
   (a) terephthalic acid or a 1 to 4 carbon atom dialkyl ester thereof;
   (b) a dimer acid;
   (c) a poly(tetramethylene oxide) glycol having a molecular weight of from about 600 to about 2,000;
   (d) 1,4-butane diol; and
   (e) an ionic compound having the formula

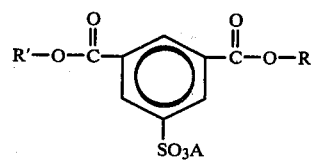

where A is an alkali radical and where R and R' are alkyls having from 1 to 4 carbon atoms;
   the amount of said terephthalic acid or said dialkyl ester thereof ranging from about 80.0 mole percent to about 99.9 mole percent, and the amount of said dimer acid ranging from about 0.1 mole percent to about 15.0 mole percent, said percentages being based upon the total number of moles of said acid constituents or reactive equivalents thereof, the amount of said poly(tetramethylene oxide) glycol ranging from about 2.0 to about 12.0 mole percent andd the amount of said 1,4-butane diol ranging from about 88.0 mole percent to about 98.0 mole percent, and from about 0.1 to about 5.0 mole percent of said ionic compound, the total mole percent of said acid, said dimer acid, and said ionic compound being about 100 mole percent, additionally including a molar excess of said 1,4-butane diol ranging from about 5.0 to about 120 percent, said mole percentages of said excess 1,4-butane diol being based upon the total number of moles of said glycol and said 88.0 to said 98.0 mole percent of said 1,4-butane diol so that the molar ratio of all of said glycol constituents to all of said acid constituents or their reactive equivalents and said ionic compound ranges from about 1.05 to about 2.2.

2. A high melt strength elastomeric copolyester according to claim 1, having an intrinsic viscosity of from about 0.9 to about 1.5 as determined in a 60/40 by volume mixed solvent system of phenol and tetrachloroethane at 30° C.

3. A high melt strength elastomeric copolyester according to claim 2, wherein the amount of said terephthalic acid or dialkyl esters thereof range from about 99.5 to about 81.8 mole percent and said dimer acid ranges from about 0.5 to about 13.2 mole percent.

4. A high melt strength elastomeric copolyester according to claim 3, wherein A of said ionic compound is lithium, sodium, or potassium, and wherein R and R' are methyl.

5. A high melt strength elastomeric polyester according to claim 4, wherein said reaction product is from dimethyl terephthate, dimer acid, poly(tetramethylene oxide)glycol having a molecular weight of about 1,000, 1,4-butane diol, wherein the amount of said ionic compound is from about 0.1 to about 3.0 mole percent, and wherein the intrinsic viscosity is from about 0.9 to about 1.3.

6. A high melt strength elastomeric polyester according to claim 5, wherein said A of said compound is sodium.

7. A high melt strength elastomeric copolyester according to claims 1, 3, 4, 5, or 6, in the form of a molded product.

8. A high melt strength elastomeric copolyester according to claims 1, 3, 4, 5, or 6, in the form of a blow-molded product.

9. A high melt strength elastomeric copolyester according to claims 1, 3, 4, 5, or 6, in the form of a filament.

10. A high melt strength elastomeric copolyester according to claims 1, 3, 4, 5, or 6, in the form of a blow-molded bottle.

11. A high melt strength elastomeric copolyester according to claims 1, 3, 4, 5, or 6, in the form of a bellow or a boot.

* * * * *